Figure 1:
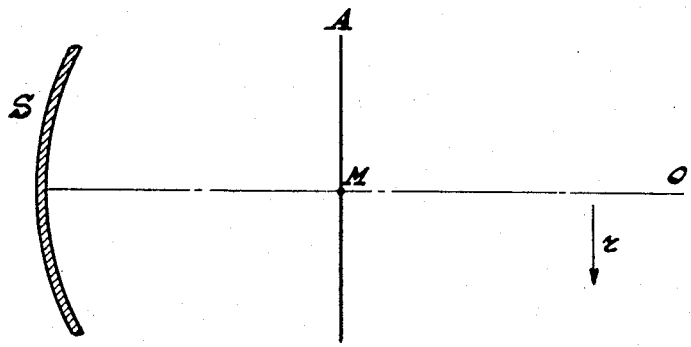

May 8, 1951

H. RINIA 2,551,852

CENTERED ROTATION-SYMMETRICAL
SCHMIDT TYPE OPTICAL SYSTEM
Filed July 15, 1946

INVENTOR
HERRE RINIA
BY [signature]
AGENT

Patented May 8, 1951

2,551,852

UNITED STATES PATENT OFFICE 2,551,852

CENTERED ROTATION-SYMMETRICAL SCHMIDT TYPE OPTICAL SYSTEM

Herre Rinia, Eindhoven, Netherlands, assignor to Hartford National Bank and Trust Company, Hartford, Conn., as trustee Application July 15, 1946, Serial No. 683,701
In the Netherlands November 11, 1942

Section 1, Public Law 690, August 8, 1946
Patent expires November 11, 1962

4 Claims. (Cl. 88—57)

There are known centred rotation-symmetrical optical systems wherein for the elimination of the spherical aberration of this system, which aberration is proportional to odd powers of the opening angle, use is made of a correcting element, for example a Schmidt camera ("Zentral Zeitung für Optik und Mechanik" 1931, page 25). Besides other faults oblique spherical aberration may occur in such systems, which fault may acquire a considerable value since it is proportional to the third power of the opening angle and to the square of the image angle.

The invention has for its object to eliminate the oblique spherical aberration of systems of the above-mentioned type.

The centred rotation-symmetrical optical system according to the invention exhibits the feature that, in order to eliminate the oblique spherical aberration of this system, the thickness of the (original) correcting element required for the elimination of the spherical aberration of this system has superposed on it a thickness which, at any point of this element, is proportional to even powers, higher than 2, of the distance between this point and the axis whilst on either side of the correcting element are arranged further elements wherein the course of the thickness in the radial direction is proportional to the course of the superposed thickness of the correcting element in the radial direction and has, in at least one of the elements, a sign opposite to that of the course of the superposed thickness, the total effect of the three elements for incident light parallel to the axis being substantially equal to the effect of the original correcting element for incident light parallel to the axis.

If, according to this construction, any of the elements should acquire a negative thickness at some point or other, it is, of course, possible to superpose on the element in question such a thickness which is constant as a function of the distance from the axis that at this point a positive thickness is obtained.

The requirement as regards the total effect of the three elements for incident light parallel to the axis has for its purpose to ensure that in spite of the introduction of the two elements the system remains nevertheless substantially free from spherical aberration. Due to the mutual distance of the elements there may still occur a slight spherical aberration which can be eliminated by a practically negligible change of the course of the thickness of the correcting element.

According to one advantageous form of construction of the centred rotation-symmetrical system according to the invention the ratio between the thicknesses of the two elements is at any distance from the axis inversely proportional to the square of the ratio between the distances of the elements from the correcting element whilst for both elements the course of the thickness in the radial direction has a sign opposite to that of the course of the superposed thickness of the correcting element in the radial direction.

The invention is particularly advantageous when applied to a camera which comprises a spherical mirror as the objective and wherein the original correcting element is arranged in the centre of curvature of this mirror, for with such a camera, which is free from coma and astigmatism of the third order, the oblique spherical aberration is the most important fault which occurs in the case of a large opening and a moderate image field.

The invention will be explained more fully with reference to the accompanying drawing wherein Fig. 1 represents a sectional view according to the optical axis O of a known camera.

Figure 2:
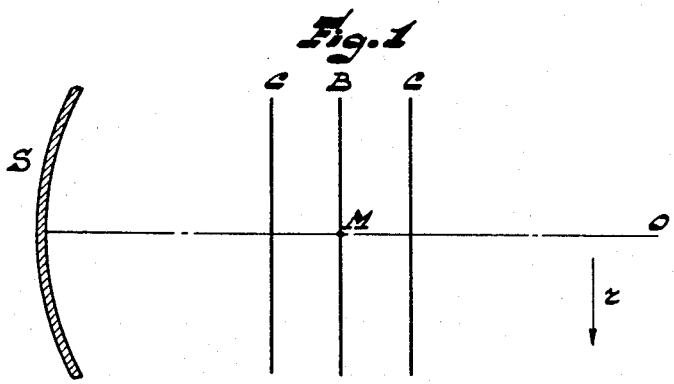
Figure 3:
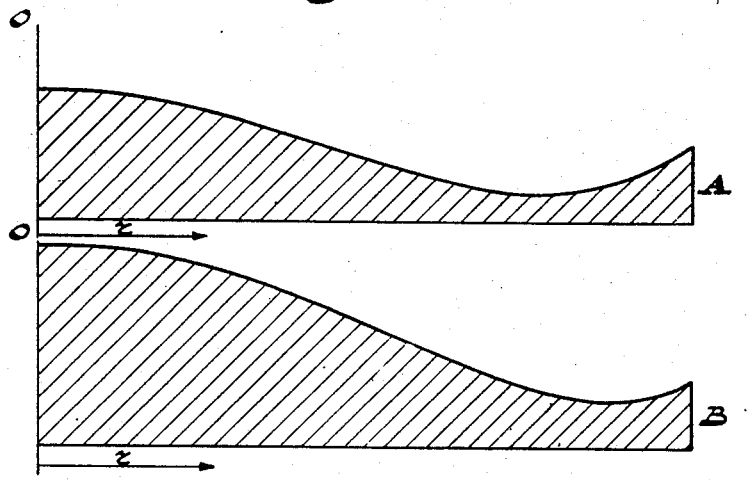

Fig. 2 represents a sectional view according to the optical axis O of a camera which comprises a centred rotation-symmetrical optical system according to the invention whilst Fig. 3 illustrates the course of the thickness as a function of the distance from the axis of the elements occurring in Figs. 1 and 2.

The camera according to Fig. 1 consists of a spherical concave mirror S and of an element A for correcting the spherical aberration, which element is arranged in the centre of curvature M of the said mirror. Fig. 3 shows the course of the thickness of this element in the direction of the optical axis O as a function of the distance $r$ from the axis.

In the centre of curvature M of the spherical concave mirror S of Fig. 2 is arranged a correcting element B whose course of the thickness, which is represented in Fig. 3, is obtained by superposing upon the thickness of the original correcting element A a thickness which, at any point of this element, is proportional to even powers, higher than 2, of the distance between this point and the axis. At equal distances on either side of the correcting element B are arranged elements C of which the course of the thickness, represented in Fig. 3, is equal for both elements and is in both elements proportional to the course of the superposed thickness of the correcting element B and has the opposite sign of this course. The total effect of the three elements of Fig. 2 for incident light parallel to the axis substantially corresponds to the effect of the correcting element A of Fig. 1 for incident light parallel to the axis.

What I claim is:

1. A centered rotational symmetric optical system having an axis of symmetry and comprising a spherical mirror, a principal spherical aberration correcting element positioned at the center of curvature of said mirror, and two auxiliary elements correcting for oblique spherical aberration of said system and spaced equidistantly from said principal element on opposite sides thereof, said principal element having an axial thickness at each radial distance from said axis equal to the sum of the thickness of a spherical aberration correcting plate calculated to correct for the spherical aberration of a system corresponding to the said centered rotational symmetric system without said auxiliary elements and a correction thickness equal to the sum of a first constant and terms of even powers greater than the second power of the radial distance from said axis, one of said auxiliary plates having a thickness equal to a second constant plus a thickness directly proportional to said correction thickness, the other of said auxiliary elements having a thickness equal to a third constant plus a thickness directly proportional to and of opposite sign from said correction thickness.

2. A centered rotational symmetric optical system having an axis of symmetry and comprising a spherical mirror, a principal spherical aberration correcting element positioned at the center of curvature of said mirror, and two auxiliary elements correcting for oblique spherical aberration of said system and spaced equidistantly from said principal element on opposite sides thereof, said principal element having an axial thickness at each radial distance from said axis equal to the sum of the thickness of a spherical aberration correcting plate calculated to correct for the spherical aberration of a system corresponding to the said centered rotational symmetric system without said auxiliary elements and a correction thickness equal to the sum of a first constant and terms of even powers greater than the second power of the radial distance from said axis, one of said auxiliary plates having a thickness equal to a second constant plus a thickness directly proportional to said correction thickness, the other of said auxiliary elements having a thickness equal to a third constant plus a thickness directly proportional to and of opposite sign from said correction thickness, the sum of said principal element thickness and said auxiliary element thicknesses having variations substantially equal to the variations of said spherical aberration correcting plate.

3. A centered rotational symmetric optical system having an axis of symmetry and corrected for spherical and oblique spherical aberration and comprising a spherical mirror, a principal correcting element positioned at the center of curvature of said mirror, and two auxiliary elements spaced equidistantly from said principal element on opposite sides thereof, said principal element having an axial thickness at each radial distance from said axis equal to the sum of the thickness of a spherical aberration correcting plate calculated to correct for the spherical aberration of a system corresponding to the said centered rotational symmetric system without said auxiliary elements and a correction thickness equal to the sum of a first constant and a series of terms of even powers greater from said axis, said auxiliary plates having thicknesses equal respectively to a second constant thickness equal respectively to a second constant plus a thickness directly proportional to and of opposite sign from said correction thickness and to a third constant plus a thickness directly proportional to and of opposite sign from said correction thickness, the ratio between the thicknesses of the said two auxiliary elements being inversely proportional to the square of the ratio between the distance of the said auxiliary elements from the said principal element.

4. In a camera, a centered rotational symmetric optical system having an axis of symmetry and corrected for spherical and for oblique spherical aberration and comprising a spherical mirror, a principal spherical aberration correcting element positioned at the center of curvature of said mirror, and two auxiliary elements correcting for oblique spherical aberration of said system and spaced from said principal element on opposite sides thereof, said principal element having an axial thickness at each radial distance from said axis equal to the sum of the thickness of a spherical aberration correcting plate calculated to correct for the spherical aberration of a system corresponding to the said centered rotational symmetric system without said auxiliary elements and a correction thickness equal to the sum of a constant and a series of terms of even powers greater than the second power of the radial distance from said axis, one of said auxiliary plates having a thickness equal to a constant plus a thickness directly proportional to said correction thickness, the other of said auxiliary elements having a thickness equal to a constant plus a thickness directly proportional to and of opposite sign from said correction thickness.

HERRE RINIA.

REFERENCES CITED

The following references are of record in the file of this patent:

UNITED STATES PATENTS

| Number | Name | Date |
|---|---|---|
| 2,170,979 | Straubel | Aug. 29, 1939 |
| 2,273,801 | Landis | Feb. 17, 1942 |
| 2,298,808 | Ramberg | Oct. 13, 1942 |
| 2,332,930 | Rinia | Oct. 26, 1943 |
| 2,336,379 | Warmisham | Dec. 7, 1943 |

FOREIGN PATENTS

| Number | Country | Date |
|---|---|---|
| 3,058 | Great Britain | of 1903 |
| 426,539 | Great Britain | Apr. 4, 1935 |